US012691911B2

(12) United States Patent
Fei et al.

(10) Patent No.: US 12,691,911 B2
(45) Date of Patent: Jul. 28, 2026

(54) PRECAUTIONARY PLANNING OF MINIMAL RISK MANEUVERS

(71) Applicant: Zenseact AB, Gothenburg (SE)

(72) Inventors: Zhennan Fei, Gothenburg (SE); Mattias Brännström, Gothenburg (SE)

(73) Assignee: Zenseact AB, Gothenburg (SE)

( * ) Notice: Subject to any disclaimer, the term of this patent is extended or adjusted under 35 U.S.C. 154(b) by 418 days.

(21) Appl. No.: 18/062,669

(22) Filed: Dec. 7, 2022

(65) Prior Publication Data

US 2023/0174115 A1 Jun. 8, 2023

(30) Foreign Application Priority Data

Dec. 8, 2021 (EP) ..................................... 21213184

(51) Int. Cl.
*B60W 60/00* (2020.01)
*B60W 50/14* (2020.01)

(52) U.S. Cl.
CPC ........ *B60W 60/0059* (2020.02); *B60W 50/14* (2013.01); *B60W 60/0015* (2020.02); *B60W 60/0053* (2020.02); *B60W 2552/53* (2020.02); *B60W 2556/40* (2020.02); *B60W 2556/65* (2020.02)

(58) Field of Classification Search
CPC ......... B60W 60/0059; B60W 60/0015; B60W 60/0053; B60W 50/14; B60W 2552/53; B60W 2556/40; B60W 2556/65
USPC .......................................................... 701/25
See application file for complete search history.

(56) References Cited

U.S. PATENT DOCUMENTS

| | | | |
|---|---|---|---|
| 2015/0094899 A1 | 4/2015 | Hackenberg et al. | |
| 2018/0088574 A1 | 3/2018 | Latotzki et al. | |
| 2019/0092317 A1* | 3/2019 | Bonander .......... | B62D 15/0285 |
| 2020/0239027 A1 | 7/2020 | Watanabe et al. | |
| 2020/0307633 A1* | 10/2020 | Naruse ............. | B60W 60/0059 |

FOREIGN PATENT DOCUMENTS

| | | | | |
|---|---|---|---|---|
| DE | 102019216363 A1 * | 4/2021 | ............. | B60Q 1/525 |
| EP | 3552901 A2 | 10/2019 | | |

OTHER PUBLICATIONS

EPO Communication with European Search Report dated May 23, 2022 for Patent Application No. 21213184.1. filed Dec. 8, 2021, consisting of 8-pages.

* cited by examiner

*Primary Examiner* — Erin M Piateski
*Assistant Examiner* — Michael T Dowling
(74) *Attorney, Agent, or Firm* — Weisberg I.P. Law, P.A.

(57) ABSTRACT

An MRM planning system for supporting planning of a minimal risk maneuver, MRM, of an Automated Driving System. The system determines a remaining distance to an upcoming operational design domain, ODD, exit at which an ODD defined for the autonomous driving mode is planned to end. The system further assesses, when the remaining distance is shorter than a predeterminable distance, data associated with a stretch of road leading up to the ODD exit. The system identifies based on the assessment of the data, a favourable region along the stretch of road for potentially bringing the vehicle to a stop deemed safe subsequent a potential MRM being triggered. The system determines a timing at which to initiate an autonomous driving mode DDT termination procedure at which to provide a handover request prompting an occupant of the vehicle to take over the DDT.

17 Claims, 4 Drawing Sheets

PRECAUTIONARY PLANNING OF MINIMAL RISK MANEUVERS

CROSS REFERENCE TO RELATED APPLICATION

This Application is related to and claims priority to European Patent Application No. EP 21213184.1, filed Dec. 8, 2021, entitled PRECAUTIONARY PLANNING OF MINIMAL RISK MANEUVERS the entirety of which is incorporated herein by reference.

TECHNICAL FIELD

The present disclosure relates to supporting planning of a minimal risk maneuver, MRM, of an Automated Driving System, ADS, of a vehicle.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by collision avoidance system, forward collision warning, adaptive cruise control, lane keeping assistance, etc.—are electronic systems that may aid a vehicle driver while driving. Moreover, in a not-too-distant future, Autonomous Driving, AD, for instance as defined by the SAE J3016 levels (0-5) or (3-5) of driving automation, will to greater extent find its way into modern vehicles. AD along with ADAS will herein be referred to under the common term Automated Driving System, ADS, corresponding to all different levels of automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

An ADS with a relatively high level of driving automation, such as for instance exemplified by at least level 3 of SAE J3016, may—as thus discussed in the foregoing—offer the feature of unsupervised autonomous driving, e.g. to enhance a comfort and convenience experience, by allowing a vehicle occupant such as a driver to engage in non-driving related tasks. Such high automation can, however, only be operated under certain conditions. The commonly known concept Operational Driving Domain, ODD, has thus been introduced in the field to define all those conditions sufficient for approving or disapproving autonomous driving feature modes. In general, conditions that potentially may affect an ADS can be either internal or external; the internal conditions mainly concerning the ego vehicle itself, such as its sensors, ADS health and/or its connectivity e.g. to clouds and/or other vehicles, while the external conditions are concerned with environment, such as e.g. road infrastructure, operational terrain and associated location-dependent characteristics, quasi-stationary conditions e.g. road works, precipitation, temperature, wind, visibility, icing etc., all movable objects and/or actors in the operating environment for instance exemplified by dynamic elements e.g. vehicles, VRUs, etc., rules of engagement e.g. traffic laws, customary signaling etc., and/or e.g. availability and freshness of infrastructure data and mapping detail, etc.

ADS feature modes, such as for instance Highway Pilot, may be activated or deactivated—for instance under the responsibility of a mode manager component of the ADS—when the ego vehicle is within the ODD, e.g., driving on a qualified road infrastructure under suitable weather and road conditions. To enable transitions among different modes accurately and safely, the ODD may be monitored—e.g. by an ODD monitor component of the ADS—and its status continuously reported, e.g. to the exemplified mode manager which in correspondence thereto might transition to other modes. Specifically, when the ODD conditions for activation are met and e.g. reported by the exemplifying ODD monitor; upon arrival of an activation request e.g. made by a vehicle driver, the exemplifying mode manager may transition to the ADS feature mode such as the AD feature mode where the Dynamic Driving Task, DDT, is performed by the ADS. On the other hand, once a condition for keeping the ADS feature mode active is not satisfied, the DDT may then be interrupted and the ADS's feature mode deactivated before the exit of the ODD. Depending on the ODD condition(s) being violated and the incurred severity, the deactivation mechanism may occasionally—such as subsequent a rare server failure—be performed by immediate initiation of a Minimal Risk Maneuver, MRM, bringing the vehicle to stop, or potentially to a degraded mode where slowing down might fulfill the minimal risk condition. More commonly, however, is initiating a DDT termination procedure, for instance prompting a handover request to a vehicle occupant such as the driver, asking him or her to take over the DDT and drive manually before reaching the ODD exit. If the driver ignores the request or does not respond to it by actuating the deactivation interface within a certain time limit e.g. within 10-20 seconds—which optionally may equate to an DDT fallback condition then being fulfilled—an MRM to bring the vehicle to stop may consequently be triggered. When the vehicle then subsequently reaches a standstill state and e.g. further electrical parking brake is applied, the ADS mode may be deactivated.

In current practice, e.g. considering automated driving at SAE level 3, the distance to an upcoming ODD exit is monitored and compared to a threshold, for instance set to 1000 meters. If the distance is shorter than said threshold, a handover request will be sent to the vehicle occupant such as the driver. Should the driver ignore the request or not respond within a certain amount of time such as within 20 seconds, an MRM will be triggered to then bring the vehicle to stop, for instance—as shown in exemplifying FIG. 1a—bring the vehicle PA1 to stop in a shoulder lane PA2 right before the ODD exit PA3, or—as shown in exemplifying FIG. 1b—at least partially in a marginal space PA4 adjacent lane barriers right before the ODD exit PA3, or—as shown in exemplifying FIG. 1c—in an actual lane PA5 right before the ODD exit PA3. Enabling the MRM the ability to bring the vehicle to a safe stop in a region eliminating or reducing exposure to incidents, such as a potential rear collision, is of greatest importance, thus providing room for alternative solutions and/or improvements.

SUMMARY OF THE INVENTION

It is therefore an object of embodiments herein to provide an approach for in an improved and/or alternative manner support planning of a minimal risk maneuver, MRM, of an Automated Driving System, ADS, of a vehicle.

The object above may be achieved by the subject-matter disclosed herein. Embodiments are set forth in the appended claims, in the following description and in the drawings.

The disclosed subject-matter relates to a method performed by an MRM planning system for supporting planning of a minimal risk maneuver, MRM, of an Automated Driving System, ADS, of a vehicle. The MRM planning system determines while a dynamic driving task, DDT, of the vehicle is performed by an autonomous driving mode of the ADS, a remaining distance to an upcoming operational design domain, ODD, exit at which an ODD defined for the autonomous driving mode is planned to end. The MRM planning system further assesses, when the remaining distance is shorter than a predeterminable distance, data associated with a stretch of road leading up to the ODD exit, which data is indicative of potential temporary and/or emergency stopping areas, shoulder lanes and/or margin space alongside a lane or lanes of the stretch of road, and/or potential occupancy and/or obstruction thereof. Moreover, the MRM planning system identifies based on the assessment of said data, a favourable region along the stretch of road for potentially bringing the vehicle to a stop deemed safe subsequent a potential MRM being triggered. Furthermore, the MRM planning system determines a timing at which to initiate an autonomous driving mode DDT termination procedure, for instance at which to provide a handover request prompting an occupant of the vehicle to take over the DDT, which timing is calculated to occur a predeterminable time duration and/or distance before the vehicle reaching the identified favourable region.

The disclosed subject-matter further relates to an MRM planning system for—and/or adapted for—supporting planning of a minimal risk maneuver, MRM, of an Automated Driving System, ADS, of a vehicle. The MRM planning system comprises a remaining distance determining unit for determining while a dynamic driving task, DDT, of the vehicle is performed by an autonomous driving mode of the ADS, a remaining distance to an upcoming operational design domain, ODD, exit at which an ODD defined for the autonomous driving mode is planned to end. The MRM planning system further comprises a data assessing unit for assessing, when the remaining distance is shorter than a predeterminable distance, data associated with a stretch of road leading up to the ODD exit, which data is indicative of potential temporary and/or emergency stopping areas, shoulder lanes and/or margin space alongside a lane or lanes of the stretch of road, and/or potential occupancy and/or obstruction thereof. Moreover, the MRM planning system comprises a favourable region identifying unit for identifying based on the assessment of said data, a favourable region along the stretch of road for potentially bringing the vehicle to a stop deemed safe subsequent a potential MRM being triggered. Furthermore, the MRM planning system comprises a timing determining unit for determining a timing at which to initiate an autonomous driving mode DDT termination procedure, for instance at which to provide a handover request prompting an occupant of the vehicle to take over the DDT. The timing is calculated to occur a predeterminable time duration and/or distance before the vehicle reaching the identified favourable region.

Furthermore, the disclosed subject-matter relates to a vehicle comprising an MRM planning system as described herein.

Moreover, the disclosed subject-matter relates to a computer program product comprising a computer program containing computer program code means arranged to cause a computer or a processor to execute the steps of an MRM planning system described herein, stored on a computer-readable medium or a carrier wave.

The disclosed subject-matter further relates to a non-volatile computer readable storage medium having stored thereon the computer program product.

Thereby, there is introduced an approach enabling safe stop of a vehicle should an MRM be triggered, e.g. as a result of a potential handover request being ignored. That is, since there is determined, while a dynamic driving task, DDT, of a vehicle is performed by an autonomous driving mode of the ADS, a remaining distance to an upcoming operational design domain, ODD, exit at which an ODD defined for the autonomous driving mode is planned to end, there is—e.g. continuously and/or intermittently—derived and/or calculated, as the vehicle is travelling with a—e.g. unsupervised—autonomous driving mode active, a remaining distance to an expected end of an ODD pertinent the autonomous driving mode. Accordingly, there is established and/or kept track of for how much further and/or longer—e.g. external conditions of—an ODD associated with the autonomous driving mode are expected to be fulfilled—and subsequently for how much further and/or longer the vehicle may be expected to be allowed to remain active in the autonomous driving mode—before having to leave said mode, e.g. in favour of a manual driving mode. Moreover, that is, since there is assessed, when the remaining distance is shorter than a predeterminable distance, data associated with a stretch of road leading up to the ODD exit, which data is indicative of potential temporary and/or emergency stopping areas, shoulder lanes and/or margin space alongside a lane or lanes of the stretch of road, and/or potential occupancy and/or obstruction thereof, there is subsequent the vehicle being determined to be within a set distance from the ODD exit, analysed e.g. continuously and/or intermittently, data—e.g. derived and/or gathered from a digital map and/or from sensors e.g. via inter-vehicle communication—revealing potential regions along and/or on one or more road segments leading up the ODD exit, where a temporary stop or emergency stop of the vehicle potentially may be feasible and/or available. Furthermore, that is, since there is identified based on the assessment of the data a favourable region along the stretch of road for potentially bringing the vehicle to a stop deemed safe subsequent an MRM being triggered, there is filtered out from the assessment of the data associated with the stretch of road leading up to the ODD exit—in e.g. balancing closeness to the ODD exit with safety considerations—a favoured location at which the vehicle hypothetically may be brought to a safe temporary and/or emergency stop should a situation occur with an MRM being triggered, e.g. following a vehicle occupant failing and/or refraining from taking over the DDT within a predeterminable time limit from a handover request being prompted and/or e.g. following a DDT fallback condition being met. Accordingly, there may be selected, out of potentially plural assessed regions—when considering how safe respective assessed zone is deemed to be e.g. in view of its nearness to where the ODD defined for the autonomous driving mode is expected to no longer be fulfilled—a preferred region considered suitable for potentially bringing the vehicle to a safe stop should an MRM be triggered. Moreover, that is, since there is determined a timing at which to initiate an autonomous driving mode DDT termination procedure—for instance at which to provide a handover request prompting an occupant of the vehicle to take over the DDT—which timing is calculated to occur a predeterminable time duration and/or distance before the vehicle reaching the identified favourable region, there is established—from applying to the favourable region a sufficient distance and/or a time margin—an upcoming geographical position of the vehicle and/or upcoming point in time, at which to e.g. prompt a handover request requesting a vehicle occupant such as the driver of the vehicle to take over the driving task thereof. Accordingly, there is determined a timing at which to initiate an autonomous driving mode DDT termination procedure—such as a timing at which to provide a handover request—which is based on and/or derived from the identified favourable region, rather than—as known in the art—a handover request being provided at a predetermined distance from an expected ODD exit. That is, for instance considering the exemplifying scenarios of FIGS. 1b and 1c, it may be presumed that if the MRM has to bring the vehicle to stop, it may be preferred to stop as close as possible to the lane barriers PA6 (FIG. 1b), and/or in the temporary parking slots (FIG. 1c) because of lower risk for causing rear collision and/or blocking surrounding traffic. However, this is not always possible with the current practice of the MRM, which is only based on the distance to the ODD exit. The MRM as known in prior art, once being triggered, may either miss the wider margin area (FIG. 1b) or the temporary parking slots (FIG. 1c), or have to perform an emergent and uncomfortable trajectory in order to stop there. With the introduced concept, on the other hand, and as exemplified in FIG. 2., subsequent identifying a favourable region upon approaching a planned ODD exit, there is calculated a timing for initiating an autonomous driving mode DDT termination procedure, such as prompting a handover request, which timing is sufficient for providing the opportunity and/or ability to—should an MRM potentially be triggered—bringing the vehicle to stop at the favourable region. Consequently, the introduced concept, with its precautionary actions enabling the vehicle to—upon potential activation of the MRM—having potentially lower risk maneuver to choose, enables for improved MRM planning.

For that reason, an approach is provided for in an improved and/or alternative manner support planning of a minimal risk maneuver, MRM, of an Automated Driving System, ADS, of a vehicle.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
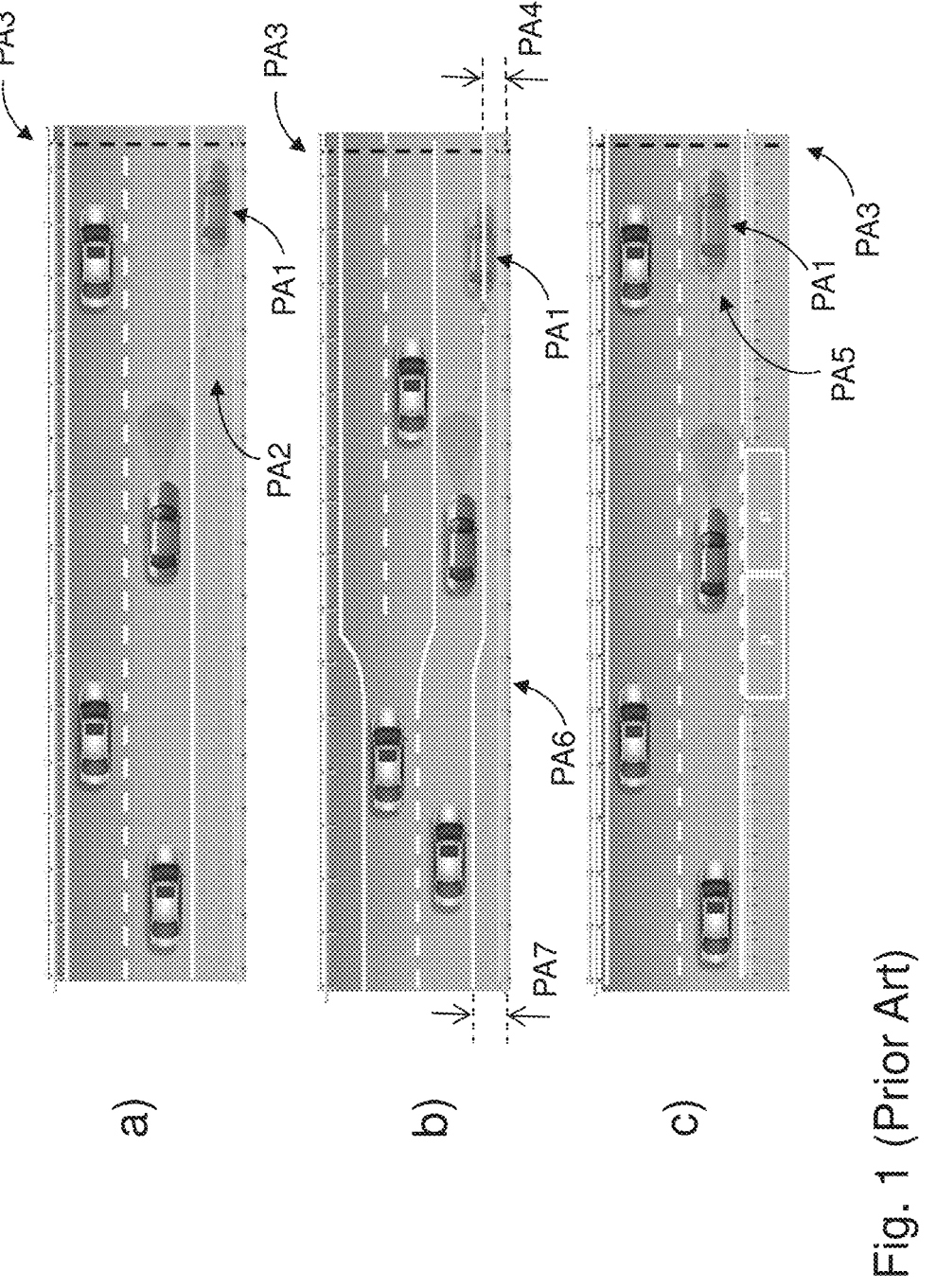
FIG. 1 illustrates schematic views of exemplifying MRM scenarios according to prior art.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting planning of a minimal risk maneuver, MRM, of an Automated Driving System, ADS, of a vehicle, there will be disclosed an approach enabling safe stop of a vehicle should an MRM be triggered, e.g. as a result of a potential handover request being ignored.

Figure 2:
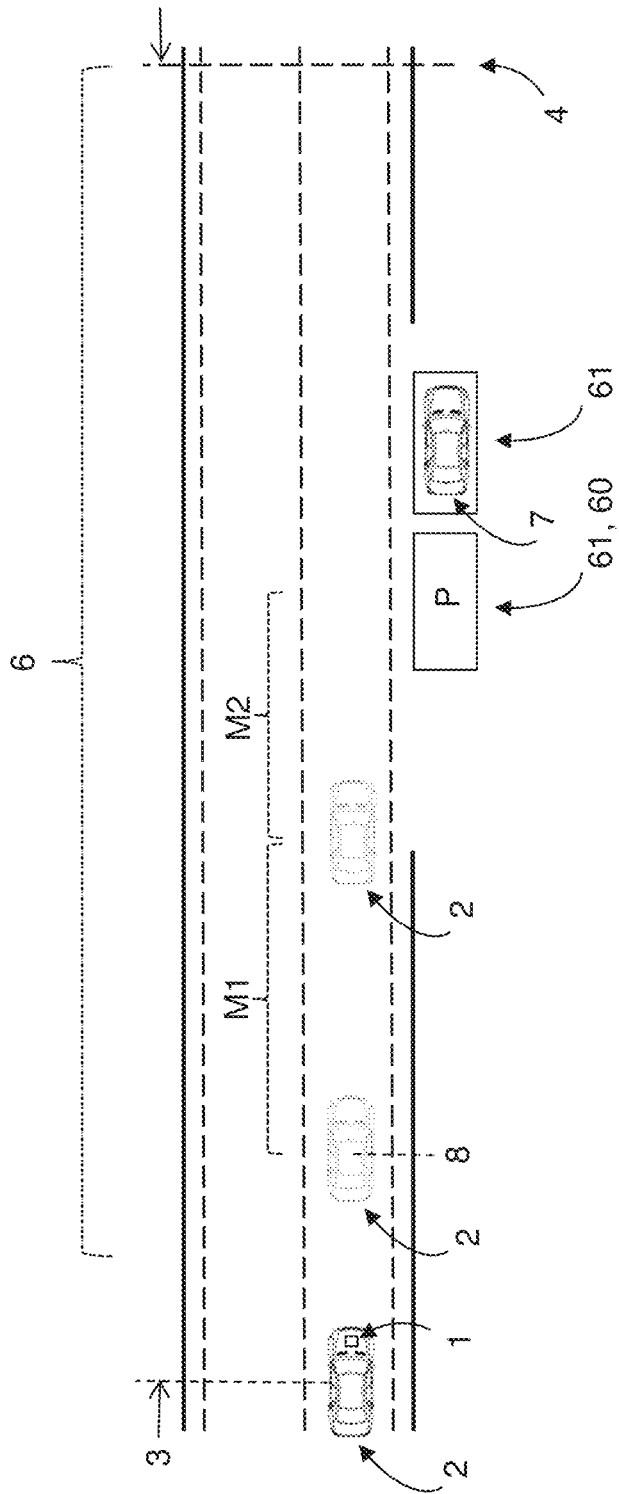
FIG. 2 illustrates a schematic view of an exemplifying scenario involving an exemplifying MRM planning system according to embodiments of the disclosure.
Figure 3:
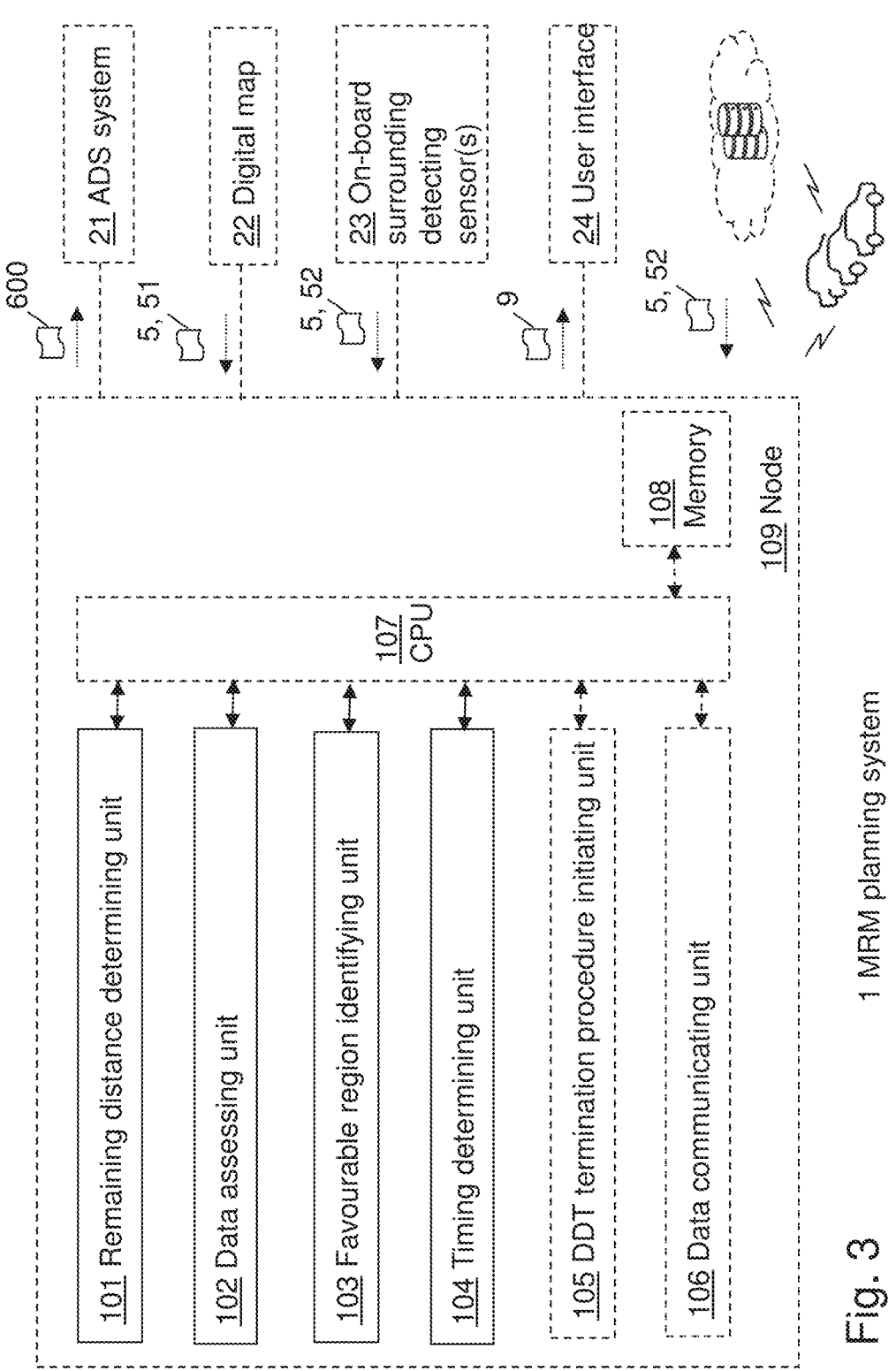
FIG. 3 is a schematic block diagram illustrating an exemplifying MRM planning system according to embodiments of the disclosure.

Referring now to the figures, there is depicted in FIG. 2 a schematic view of an exemplifying scenario involving—and in FIG. 3 a schematic block diagram illustrating—an exemplifying MRM planning system 1 according to embodiments of the disclosure. The MRM planning system 1 is adapted for supporting planning an MRM of an Automated Driving System, ADS 21, of a vehicle 2. Minimal Risk Maneuver, MRM, as referred to herein may throughout the disclosure be understood to be represented by the concept and/or definition of MRM as known in the art, and thus relate to in an automated manner bringing a vehicle to stop. Furthermore, the phrase "MRM planning system" may refer to "DDT termination procedure system", "DDT termination initiation procedure system, "DDT termination timing system", "ODD exit supporting and/or handling system", "precautionary MRM actions system" and/or "assessment system", and according to an example further to "handover request supporting, handling, timing and/or initiating system". "A method [ . . . ] for supporting" may refer to "an at least partly computer-implemented method [ . . . ] for supporting". Moreover, "ADS of a vehicle" may refer to "ADS for a vehicle", and according to an example in this context further to "ADS-equipped vehicle". "For supporting planning of an MRM of an ADS of a vehicle", on the other hand, may refer to "for supporting planning of a safe stop—and/or a stop deemed safe—for an MRM of an ADS of a vehicle", "for supporting and/or enabling a potential MRM-based safe stop—and/or a stop deemed safe—prior to an operational design domain, ODD, exit pertinent an ADS of a vehicle", "for supporting planning of a safe stop—and/or a stop deemed safe—for an ADS-equipped vehicle", and/or "for providing precautionary actions for an MRM of an ADS of a vehicle".

The vehicle 2—which may be referred to as ego-vehicle or host vehicle—may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle". Moreover, the ADS 21 of and/or for the vehicle 2 may be represented by any arbitrary ADAS or AD system e.g. known in the art and/or yet to be developed. The ADS 21 and/or vehicle 2 may comprise a perception system (not shown)—which may also be referred to as environmental perception system, sensor fusion module and/or perception module—that may be represented by any—e.g., known—system and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc., for instance with support from a—e.g. commonly known—digital map 22 such as a high definition, HD, map, and/or an equivalent and/or successor thereof. Such an optional perception system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided onboard the vehicle 2—herein also referred to as vehicle-mounted and/or onboard sensors—adapted to sense and/or perceive the vehicle's 2 surroundings and/or whereabouts, for instance represented by one or a combination of one or more of onboard surrounding detecting sensors 23, such as image capturing devices e.g. cameras, LIDARs, RADARs, ultrasonic sensors etc., and/or a positioning system, odometer, inertial measurement units etc. In other words, a perception system is in the present context thus to be understood as a module and/or system responsible for acquiring raw sensor data from on-board sensors and converting this raw data into scene understanding. The vehicle 2 and/or ADS 21 may further comprise a position determining system (not shown), which may be represented by any arbitrary feasible—e.g. known—sensors and/or functionality e.g. positioning system adapted to sense, derive and/or determine whereabouts and/or geographical position of the vehicle 2, for instance via GNSS such as GPS.

As illustrated in an exemplifying manner in exemplifying FIGS. 2 and 3, the MRM planning system 1 is—e.g. by means of a remaining distance determining unit 101—adapted and/or configured for determining, while a dynamic driving task, DDT, of the vehicle 2 is performed by an autonomous driving mode of the ADS 21, a remaining distance 3 to an upcoming operational design domain, ODD, exit 4 at which an ODD defined for the autonomous driving mode is planned to end. Thereby, as the vehicle 2 (depicted to the left in FIG. 2) is travelling with a—e.g. unsupervised—autonomous driving mode active, a remaining distance 3 to an expected end 4 of an ODD pertinent the autonomous driving mode, is—e.g. continuously and/or intermittently—derived and/or calculated. Accordingly, there is established and/or kept track of for how much further and/or longer—e.g. external conditions of—an ODD associated with the autonomous driving mode are expected to be fulfilled—and subsequently for how much further and/or longer the vehicle 2 may be expected to be allowed to remain active in the autonomous driving mode—before having to leave said mode, e.g. in favour of a manual driving mode.

The ODD defined for the autonomous driving mode may be represented by any feasible—e.g. known—ODD stipulating operating conditions under which said autonomous driving mode is designed and/or verified to function, and may for instance be concerned with environment, such as e.g. road infrastructure, operational terrain and associated location-dependent characteristics, quasi-stationary conditions e.g. road works, precipitation, temperature, wind, visibility, icing etc., all movable objects and/or actors in the operating environment for instance exemplified by dynamic elements e.g. vehicles, VRUs, etc., rules of engagement e.g. traffic laws, customary signaling etc., and/or e.g. availability and freshness of infrastructure data and mapping detail, etc. The ODD exit 4, on the other hand, may similarly be represented by any feasible dynamic or static exit—e.g. a geographical position—at which it is planned and/or expected that the vehicle 2 no longer will be within its defined ODD. The ODD exit 4 may accordingly result from one or more conditions of the ODD—e.g. one or more external conditions thereof—being planned and/or expected to further up ahead cease to be fulfilled, for instance due to an upcoming geographical area unsupportive of the autonomous driving mode, upcoming road work, upcoming change in weather conditions, and/or an upcoming change in road surface conditions, etc., data of which may be derivable in a known manner from any feasible sources such as e.g. the optional digital map 22 and/or other vehicles or pieces of infrastructure through commonly known inter-vehicle communication e.g. directly or e.g. via a cloud service. The ODD exit 4 may thus potentially change and/or be updated along with changing and/or updated circumstances. Moreover, the remaining distance 3 to the upcoming ODD exit 4 may be determined in any arbitrary—e.g. known—manner, for instance with support from and/or derived from a—e.g. known—ODD monitor and/or ODD manager component of the ADS 21, configured and/or adapted for such a task, for instance with additional support from an optional onboard position determining system and/or optional digital map 22 described in the foregoing. The autonomous driving mode, on the other hand, may be represented by any arbitrary feasible—e.g. known—automated driving mode. According to an example, said autonomous driving mode may be represented by an unsupervised autonomous driving mode where automated driving of the ADS-equipped vehicle 2 is performed without a vehicle occupant—such as a vehicle driver—being required to supervise said driving. Such unsupervised autonomous driving mode may then for instance correspond to level 3 of driving automation as defined by the SAE J3016, or at least level 3.

Moreover, the phrase "determining [ . . . ] a remining distance" may refer to "deriving, monitoring and/or estimating [ . . . ] a remaining distance", and according to an example further to "determining continuously and/or intermittently [ . . . ] a remaining distance" and/or "determining [ . . . ] a remaining distance and/or a remaining time". "While a DDT of said vehicle is performed by an autonomous driving mode", on the other hand, may refer to "as and/or provided that a DDT of said vehicle is performed by an autonomous driving mode" and/or "while said vehicle has active and/or activated an autonomous driving mode", and according to an example further to "while a DDT of said vehicle is performed by an unsupervised autonomous driving mode". Moreover, "upcoming ODD exit" may refer to "approaching, nearing and/or expected ODD exit" and/or "upcoming planned ODD exit". The phrase "ODD exit at which an ODD defined for said autonomous driving mode is planned to end", on the other hand, may refer to "ODD exit at which an ODD defined for said autonomous driving mode is determined and/or estimated to end", and according to an example further to "ODD exit at which an ODD defined for said autonomous driving mode is planned to geographically end" and/or "ODD exit at which external conditions—and/or a predeterminable set of external conditions—of an ODD defined for said autonomous driving mode is planned to end".

As further illustrated in an exemplifying manner in exemplifying FIGS. 2 and 3, the MRM planning system 1 is further—e.g. by means of a data assessing unit 102—adapted and/or configured for assessing, when the remaining distance 3 is shorter than a predeterminable distance, data 5 associated with a stretch of road 6 leading up to the ODD exit 4, which data 5 is indicative of potential temporary and/or emergency stopping areas, shoulder lanes and/or margin space alongside a lane or lanes of the stretch of road 6, and/or potential occupancy and/or obstruction thereof. Thereby, subsequent the vehicle 2 being determined to be within a set distance from the ODD exit 4, there is—e.g. continuously and/or intermittently—analysed data 5—e.g. derived and/or gathered from a digital map 22 and/or from sensors e.g. via inter-vehicle communication—revealing potential regions along and/or on one or more road segments 6 leading up the ODD exit 4, where a temporary stop or emergency stop of said vehicle 2 potentially may be feasible and/or available.

Potential temporary and/or emergency stopping areas may be represented by any arbitrary feasible regions, such as—as depicted in exemplifying FIG. 2—temporary and/or emergency parking areas 61, e.g. positioned alongside a lane of the stretch of road 6. In a similar manner, potential shoulder lanes may be represented by any feasible right-hand side and/or left-hand side shoulder lanes of any feasible length, widths and/or dimensions, e.g. additionally including breakdown lanes, bus bypass shoulders, etc. Potential margin space, on the other hand, may similarly be represented by any feasible marginal space and/or margin areas, for instance. between an outer right—or outer left—lane of the stretch of road 6 and outer road limits or potential road barriers, and further be of any feasible length, width and/or dimensions, not necessarily wider than a width of any arbitrary vehicle. Furthermore, potential occupancy and/or obstruction of potential temporary and/or emergency stopping areas, shoulder lanes and/or margin space, may be represented by any object or objects—e.g. static or dynamic—not included in the digital map 22 such as e.g. animals, bikes, VRUs, snow, road work, floods, potholes, vegetation, hanging power lines, etc and/or another vehicle 7 as depicted in exemplifying FIG. 2, at least partly causing such occupancy and/or obstruction. The predeterminable distance, on the other hand, related to triggering assessment of the data 5 associated with the stretch of road 6 leading up to ODD exit 4, may be represented by any arbitrary feasible distance, such as for instance ranging from less than 100 meters up to several thousand meters or more. In a similar manner, the stretch of road 6 may be set to and/or be represented by any arbitrary feasible distance and/or length, such as ranging from less than 100 meters up to several thousand meters. The predeterminable distance and the stretch of road 6 may potentially but not necessarily coincide. Moreover, "stretch of road leading up to said ODD exit" may refer to "one or more road segments leading up to said ODD exit", "stretch of road right before—or essentially right before—said ODD exit" and/or "predeterminable stretch of road leading up to said ODD exit", "When said remaining distance is shorter than a predeterminable distance", on the other hand, may refer to "provided that said remaining distance is shorter than a predeterminable distance" and/or "upon and/or subsequent said remaining distance being shorter than a predeterminable distance", "when said remaining distance is below a predeterminable distance threshold" and/or "when said remaining distance is nearer said ODD exit than a predeterminable distance". Moreover, "potential temporary and/or emergency stopping areas" may refer to "potential suitable stopping areas" and/or "potential temporary and/or emergency parking areas", whereas "shoulder lanes" may refer to "shoulder lanes, breakdown lanes and/or bus bypass shoulders". "Potential temporary and/or emergency stopping areas, shoulder lanes and/or margin space alongside a lane or lanes of said stretch of road", on the other hand, may refer to "potential temporary and/or emergency stopping areas, shoulder lanes and/or margin space along said stretch of road". Furthermore, the phrase "potential occupancy and/or obstruction thereof", may refer to "potential occupancy and/or obstruction of said potential temporary and/or emergency stopping areas, shoulder lanes and/or margin space", whereas "and/or potential occupancy and/or obstruction thereof", may refer to "and optionally further potential occupancy and/or obstruction thereof". Moreover, the phrase "assessing [ . . . ] data associated with a stretch of road" may refer to "assessing [ . . . ] data associated with a stretch of road or roads", "assessing [ . . . ] derived and/or gathered data associated with at stretch of road", "assessing [ . . . ] data pertinent and/or relevant for a stretch of road", "assessing [ . . . ] at least a portion of data associated with a stretch of road" and/or "assessing [ . . . ] data associated with at least a portion of a stretch of road", and according to an example further to "assessing continuously and/or intermittently [ . . . ] data associated with at stretch of road" and/or "assessing [ . . . ] road characteristics-related, road topology-related, environmental-related and/or traffic-related data associated with a stretch of road". "Said data being indicative of", on the other hand, may refer to "said data revealing and/or comprising".

The data 5 associated with the stretch of road 6 indicative of potential stopping areas, shoulder lanes and/or margin space alongside a lane or lanes of the stretch of road 6, and/or potential occupancy and/or obstruction thereof, may be represented by any arbitrary feasible data of any format and/or level of detail potentially revealing such information and/or pieces thereof. In addition thereto, the data 5 may further comprise any arbitrary feasible information of relevance in view of said stretch of road 6, such as statistical data—e.g. covering incidents, traffic patterns, road conditions etc.—and/or dynamic data covering e.g. current—or essentially current—traffic situation(s), road user(s) behaviour(s), road surface condition(s), weather condition(s), weather forecast(s) etc., which may be derived from any feasible sources and/or entities supportive of delivering such data. Optionally, the data 5 may comprise map-based data 51, for instance derived from a digital map 22, such as an HD map, covering the stretch of road 6. Thereby, data 5 indicative of potential temporary and/or emergency stopping areas, shoulder lanes and/or margin space alongside a lane or lanes of the stretch of road 6, may be gathered at least partly from and/or based on map data 51, which may—e.g. as commonly known—comprise relevant road information in view of the stretch of road 6 such as e.g. road characteristics, road topology, speed limits etc. thereof. Additionally or alternatively, optionally, the data 5 may comprise sensor-based data 52. Thereby, data 5 indicative of potential temporary and/or emergency stopping areas, shoulder lanes and/or margin space alongside a lane or lanes of the stretch of road 6, and/or potential occupancy and/or obstruction thereof, may be gathered at least partly from and/or based on sensor data 52, which may comprise relevant information revealing potential availability of—and/or occupancy and/or obstruction of—potential temporary and/or emergency stopping areas, shoulder lanes and/or margin space alongside a lane or lanes of the stretch of road 6. Further optionally, at least a portion of the sensor-based data 52 may be gathered from one or more sensors offboard the vehicle 2, for instance with support from at least a first inter vehicle communication service. Thereby, sensor-based data 52—e.g. probe sourcing data—may at least partly be retrieved from one or more sensor-equipped dynamic or static entities other than said vehicle 2—such as other vehicles, pieces of infrastructure, etc.—for instance via commonly known inter vehicle communication, such as directly e.g. via V2V/V2I and/or with support from commonly known cloud service(s) and/or swarm service(s). According to an example and as illustrated in an exemplifying manner in FIG. 2, a piece of sensor-based data 52—for instance position-based—retrieved e.g. from another vehicle 7, may thus reveal that this other vehicle 7 occupies a temporary and/or emergency stopping area 61 alongside a lane or lanes of said stretch of road 6. The sensor-based data 52 may stem from any arbitrary type of sensor(s), such as for instance from position determining system(s), traction sensor(s), weather condition sensor(s), etc. Optionally, however, the sensor-based data 52 may be derived from at least a first surrounding detecting sensor capable of capturing surroundings covering at least a portion of the stretch of road 6. Thereby, sensor-based data 52 may be gathered with support from one or more surrounding detecting sensors, such as for instance one or a combination of image capturing devices e.g. cameras, LIDARs, RADARs, ultrasonic sensors etc., provided onboard—and/or remote from—the vehicle 2. Accordingly, sensor-based data 52 may, in addition and/or as an alternative to being retrieved from surrounding detecting sensor(s) 23 onboard the vehicle 2, be retrieved from surrounding detecting sensor(s) of one or more dynamic or static entities other than said vehicle 2—such as other vehicles, pieces of infrastructure e.g. surveillance cameras thereof, etc.—for instance via commonly known inter vehicle communication, such as directly e.g. via V2V/V2I and/or with support from commonly known cloud service(s) and/or swarm service(s). Thus, according to an example and as illustrated in an exemplifying manner in FIG. 2, a piece of sensor-based data 52 retrieved from either onboard surrounding detecting sensor(s) 23 or surrounding detecting sensor(s) of other entities, may hence reveal when e.g. an object not included in the digital map 22—e.g. another vehicle 7—occupies a temporary and/or emergency stopping area 61 alongside a lane or lanes of said stretch of road 6. In addition to the sensor-based data 52 being indicative of potential temporary and/or emergency stopping areas, shoulder lanes and/or margin space alongside a lane or lanes of the stretch of road 6, and/or potential occupancy and/or obstruction thereof, the sensor-based data 52 may further comprise dynamic data such as discussed above, thus for instance information revealing current—or essentially current—traffic situation(s), road user(s) behaviour(s), road surface condition(s), weather condition(s) etc.

As further illustrated in an exemplifying manner in exemplifying FIGS. 2 and 3, the MRM planning system 1 is further—e.g. by means of a favourable region identifying unit 103—adapted and/or configured for identifying based on the assessment of said data 5, a favourable region 60 along the stretch of road 6 for potentially bringing the vehicle 2 to a stop deemed safe subsequent an MRM being triggered. Thereby, there is filtered out from the assessment of the data 5 associated with the stretch of road 6 leading up to the ODD exit 4—in e.g. balancing closeness to the ODD exit 4 with safety considerations—a favoured location 60 at which said vehicle 2 hypothetically may be brought to a safe temporary and/or emergency stop should a situation occur with an MRM being triggered, e.g. following a vehicle occupant failing and/or refraining from taking over the DDT within a predeterminable time limit from a handover request being prompted and/or e.g. following a DDT fallback condition being met. Accordingly, there may be selected, out of potentially plural assessed regions—when considering how safe respective assessed zone is deemed to be e.g. in view of its nearness to where the ODD defined for the autonomous driving mode is expected to no longer be fulfilled—a preferred region 60 considered suitable for potentially bringing the vehicle 2 to a safe stop should an MRM be triggered.

The favourable region 60—which may be of any arbitrary feasible dimensions—may be represented by any feasible area, location and/or zone selected as being the favoured choice for potentially bringing the vehicle 2 to a safe temporary stop before the ODD exit 4 should the hypothetical situation of an MRM being triggered occur. The favourable region 60 may accordingly be located at any feasible position along the stretch of road 6 leading up to the ODD exit 4, such as at a temporary and/or emergency stopping area, in a shoulder lane and/or in a margin space alongside a lane or lanes of the stretch of road 6, or even in such a lane. A stop being deemed safe, may be represented by temporarily stopping there being considered and/or classified as safe, for instance at least to a certain extent, degree and/or level, such as e.g. in view of potential rear collision(s), and/or e.g. in view of potentially blocking surrounding traffic. Different regions may thus be considered safe to differing extent; for instance, temporarily stopping in a temporary and/or emergency stopping area—e.g. temporary and/or emergency parking area 61—may be deemed more safe as compared to temporarily stopping in a shoulder lane, which in turn may be deemed more safe as compared to temporarily stopping at least partially in a margin space, which in turn may be deemed more safe as compared to temporarily stopping in one of lanes of the stretch of road 6, which in turn may be deemed safer as compared to temporarily stopping in an other one of said lanes, etc. Yet further parameters may affect whether and/or to what extent a region is deemed safe, such as one or more of e.g. width of margin space, road topology e.g. in view of curves, depressions, hills, etc, statistical data e.g. in view of incidents, dynamic circumstances pertinent the stretch of road 6, etc. For instance, depending on e.g. road topology, statistical data e.g. in view of incidents and/or e.g. a current traffic situation, road user(s) behaviour(s), road surface condition(s) and/or weather conditions, etc., it may be deemed safer to temporarily stop e.g. in a current lane than e.g. during heavy traffic crossing to the left or right one or more lanes to reach e.g. a temporary and/or emergency stopping area, shoulder lane and/or margin space, deemed safer to temporarily stop e.g. at least partially in a margin space than e.g. in an incident-prone shoulder lane, and/or deemed safer to temporarily stop e.g. in a shoulder lane adjacent to the current lane than e.g. during icy and/or slippery road conditions crossing one or more lanes to reach a temporary and/or emergency stopping area, etc.

In a similar manner, a variety of parameters—such as e.g. width of margin space, road topology e.g. in view of curves, depressions, hills, etc, statistical data and/or dynamic circumstances pertinent the stretch of road 6—may affect where along a temporary and/or emergency stopping area, shoulder lane, margin space and/or lane or lanes of the stretch of road 6—i.e. at what distance from the ODD exit 4—there is deemed safe to temporarily stop. Differing circumstances may render different distances to the ODD exit 4 safe to differing extent, degree and/or level. For instance, similarly, depending on e.g. road topology, statistical data e.g. in view of incidents and/or e.g. a current traffic situation, road user(s) behaviour(s), road surface condition(s) and/or weather conditions, etc., it may be deemed safer to temporarily stop at a first distance from the ODD exit 4 as compared to a second distance from the ODD exit 4 where e.g. a road depression and/or curve may be positioned, the traffic heavier, road icier and/or more slippery, etc.

Identifying the favourable region 60 may thus be accomplished by finding a balance between safety considerations and closeness to the ODD exit 4. In other words, finding the favourable region 60 may be accomplished by finding an option—i.e. region—deemed sufficiently safe while at the same time being deemed sufficiently close to the ODD exit 4. The favourable region 60 may accordingly be identified by selecting a region preferably close to an/or closer than a predeterminable distance from—or as close as possible to—the ODD exit 4, with said region meeting—e.g. during current circumstances and/or conditions—safety considerations at least to a predeterminable extent, degree and/or level. Such safety considerations, which for instance may relate to there being relatively low risk of potential rear collision(s) and/or potentially blocking surrounding traffic, may be defined in any feasible manner deemed sufficient and/or relevant. Optionally, identifying the favourable region 60 may comprise—and/or the favourable region identifying unit 103 may be adapted and/or configured for—selecting the favourable region 60 based on selection criteria striking a balance between respective levels of safety attributed to stopping in certain regions, and respective certain region's closeness to the ODD exit 4. Thereby, the region 60 along the stretch of road 6 deemed most favourable for potentially bringing the vehicle 2 to a stop subsequent an MRM being triggered, may be identified, by the selection criteria stipulating conditions filtering out the region 60 best suited. In exemplifying FIG. 2, the favourable region 60 is represented by an unoccupied temporary and/or emergency parking area 61. The phrase "identifying based on the assessment of said data" may refer to "filtering out and/or selecting based on the assessment of said data" and/or "identifying from the assessment of said data", and according to an example further to "identifying based on the assessment of said data, in balancing closeness to said ODD exit with safety" and/or "identifying based on the assessment of said data, in balancing closeness to said ODD exit with safety given current circumstances". "Favourable region", on the other hand. may refer to "favourable area, location and/or zone", "favoured, suitable, and/or preferred region" and/or to "region deemed favourable, suitable and/or preferred", and according to an example further to "favourable region when balancing closeness to said ODD exit with safety". Moreover, "favourable region along said stretch of road" may refer to "favourable region alongside and/or on said stretch of road". The phrase "for potentially bringing said vehicle to a stop deemed safe", on the other hand, may refer to "for potentially bringing said vehicle to a stop deemed low-risk, e.g. in view of rear collision(s) and/or blocking surrounding traffic", "for potentially bringing said vehicle to a safe stop", "for potentially bringing said vehicle to a temporary and/or emergency stop, standstill and/or parking deemed safe", "at which potentially bringing said vehicle to a stop deemed safe" and/or "for potentially bringing said vehicle to a stop considered, classified and/or determined as safe". Moreover, the phrase "subsequent a potential MRM being triggered" may refer to "should a potential MRM be triggered", and according to an example further to "subsequent a potential MRM being triggered following a vehicle occupant failing to take over the DDT within a predeterminable time limit from a handover request being prompted" and/or "subsequent a potential MRM being triggered following a DDT fallback condition being met".

As further illustrated in an exemplifying manner in exemplifying FIGS. 2 and 3, the MRM planning system 1 is further—e.g. by means of a timing determining unit 104—adapted and/or configured for determining a timing 8 at which to initiate an autonomous driving mode DDT termination procedure, for instance at which to provide a handover request prompting an occupant of the vehicle 2 to take over the DDT, which timing 8 is calculated to occur a predeterminable time duration and/or distance before the vehicle 2 reaching the identified favourable region 60. Thereby, there is established—from applying to the favourable region 60 a sufficient distance and/or a time margin—an upcoming geographical position 8 of the vehicle 2 and/or upcoming point in time 8, at which to e.g. prompt a handover request requesting a vehicle occupant such as the driver of the vehicle 2 to take over the driving task thereof. Accordingly, there is determined a timing 8 at which to initiate an autonomous driving mode DDT termination procedure, such as a timing at which to provide a handover request, which is based on and/or derived from the identified favourable region 60, rather than—as known in the art—a handover request being provided at a predetermined distance from an expected ODD exit. That is, for instance considering the exemplifying scenarios of FIGS. 1*b* and 1*c*, it may be presumed that if the MRM has to bring the vehicle PA1 to stop, it may be preferred to stop as close as possible to the lane barriers PA6 (FIG. 1*b*), and/or in the temporary parking slots P (FIG. 1*c*) because of lower risk for causing rear collision and/or blocking surrounding traffic. However, this is not always possible with the current practice of the MRM, which is only based on the distance to the ODD exit PA3. The MRM as known in prior art, once being triggered, may either miss the wider margin area PA7 (FIG. 1*b*) or the temporary parking slots P (FIG. 1*c*), or have to perform an emergent and uncomfortable trajectory in order to stop there. With the introduced concept, on the other hand, and as exemplified in FIG. 2, subsequent identifying a favourable region 60 upon approaching a planned ODD exit 4, there is calculated a timing 8 for initiating an autonomous driving mode DDT termination procedure, such as prompting a handover request, which timing 8 is sufficient for providing the opportunity and/or ability to—should an MRM potentially be triggered—bringing the vehicle 2 to stop at the favourable region 60. Consequently, the introduced concept, with its precautionary actions enabling the vehicle 2 to—upon potential activation of the MRM—having potentially lower risk maneuver to choose, enables for improved MRM planning.

The predeterminable time duration and/or distance before the vehicle 2 reaching the favourable region 60, may be set in any arbitrary feasible manner, for instance ranging from seconds up to minutes and/or from less than hundred meters up to thousands of meters, for instance depending on circumstances at hand, such as vehicle speed, speed limit(s), traffic situation, etc. Of relevance is that the timing 8—and subsequently the predeterminable time duration and/or distance before the vehicle reaching the favourable region 60—should be set sufficient enough, for instance such that a handover request may be provided—e.g. sent from an optional mode manager component of the ADS 21—sufficiently early so that if an MRM is triggered, the vehicle 2 may be brought to stop in the favourable region 60, which is considered a safe stop having a low risk of collision. The timing 8 may thus be set in consideration of one or more distance and/or time margins, which may be set in any arbitrary feasible manner. For instance, and as exemplified in FIG. 2, the timing 8 may be calculated taking into consideration an exemplifying handover request compliance margin M1 giving a vehicle occupant such as a driver time to react to the potential handover request and take over the DDT and/or a path-to-stop maneuvering margin M2 for allowing the vehicle—e.g. as planned by an optional trajectory planner component of the ADS 21—to follow a safe and comfortable path to stop in the favourable region 60. Yet further parameters may as previously indicated be taken into consideration in determining the timing 8, such as e.g. speed limit(s), vehicle speed, environmental conditions e.g. traffic situation, road users behavior, weather conditions, road surface conditions, driving profile, etc. all of which for instance may be derivable from e.g. the map data 5, map-based data 51, sensor-based data 52 and/or from any other feasible source. The phrase "determining a timing" may refer to "calculating a timing" and/or "determining an upcoming time point and/or upcoming geographical position of said vehicle", whereas "initiate an autonomous driving mode DDT termination procedure" according to an example may refer to and/or comprise "provide a handover request prompting an occupant of said vehicle to take over the DDT". "Handover request" may refer to "deactivation request" and/or autonomous driving mode deactivation request". It may be noted that, potentially, determining the timing 8 based on the favourable region 60 may equate to the favourable region 60 being considered the position where the autonomous driving mode at the latest should be inactivated, which in turn may equate to subsequently pushing back an ODD exit to the position of the favourable region 60. It may furthermore be noted that actions to be performed when an MRM is activated is reactive, which is beyond the scope of this disclosure; commonly, e.g. an optional trajectory planner and e.g. an optional vehicle motion control component and/or module of the ADS 21 may plan the path and safely execute it. This is in comparison with the precautionary actions proposed by this disclosure, which essentially provides better margins and conditions for the reactive actions in case of the MRM being triggered.

Optionally, determining a timing at which to initiate an autonomous driving mode DDT termination procedure may comprise—and/or the timing determining unit 104 may be adapted for—determining a timing at which to trigger an MRM. Thereby, rather than as exemplified in the foregoing—with the scenario(s) of a vehicle ADS 21 supporting e.g. SAE level 3 driving automation and the timing for initiation of an autonomous driving mode DDT termination procedure being represented by a timing for providing a handover request prompting an occupant of the vehicle 2 to take over the DDT—the timing for initiation of an autonomous driving mode DDT termination procedure may comprise and/or be represented by a timing for immediate MRM triggering, i.e. without involving consideration of prompting a handover request. This may for instance apply should a vehicle—e.g. a robot taxi—support higher level driving automation such as SAE level 4. That is, for a vehicle supporting driverless driving automation such as SAE level 4, prompting a handover request, waiting a predeterminable time for a driver to take over the DDT and then potentially triggering an MRM, would be irrelevant; instead, the MRM may be triggered directly. This may be seen as a handover request being provided but immediately being declined and hence an MRM then immediately being triggered. Another scenario where immediate MRM triggering may apply is should there be recognized—e.g. by a Driver Monitoring component and/or system—that a vehicle driver is too far from—e.g. due to sleeping—taking over the DDT in consideration of a remaining distance to and/or time to reach an ODD exit being determined to be too short to get the driver back in the loop. Consequently, with the initiation of an autonomous driving mode DDT termination procedure comprising triggering an MRM—rather than e.g. providing a handover request—the timing for said initiation is represented by a time and/or position at which to trigger an MRM rather than e.g. providing said handover request, and the timing may thus be determined accordingly, such as e.g. comparably closer to the ODD exit 4.

As illustrated in an exemplifying manner in exemplifying FIGS. 2 and 3, the MRM planning system 1 may further—e.g. by means of an optional DDT termination procedure initiating unit 105—be adapted and/or configured for initiating an autonomous driving mode DDT termination procedure—such as providing a handover request 9 or triggering an MRM request—at, or prior to, the timing 8. Thereby, a DDT termination procedure is initiated—such as a handover request 9 being provided—at a point in time 8 and/or at a distance 8 from the favourable region 60 sufficient enough for providing the opportunity and/or ability to—should an MRM potentially be triggered—bringing the vehicle 2 to stop at the favourable region 60. The handover request 9 may be provided in any arbitrary feasible manner, for instance—as known in the art—with support from a vehicle user interface 24 such as e.g. a display and/or interactive display.

Moreover, as illustrated in an exemplifying manner in exemplifying FIGS. 2 and 3, the MRM planning system 1 may further—e.g. by means of an optional data communicating unit 106—be adapted and/or configured for communicating data 600 indicative of the identified favourable region 60 to and/or within the ADS 21, for instance to a trajectory planner and/or vehicle motion control of the ADS 21. Thereby, information 600 hinting the identified favourable region 60 is forwarded to one or more consumers to which said information 600 may be valuable as input for planning a path to the favourable region 60 and safely execute it should a potential MRM be triggered. The data 600 indicative of the favourable region 60 may be of any format and/or level of detail, and/or further communicated at any arbitrary feasible time.

As further shown in FIG. 3, the MRM planning system 1 comprises a remaining distance determining unit 101, a data assessing unit 102, a favourable region identifying unit 103, a timing determining unit 104, an optional DDT termination procedure initiating unit 105 and an optional data communicating unit 106, all of which already have been described in greater detail above. Furthermore, the embodiments herein for supporting planning of an MRM of a vehicle ADS 21, may be implemented through one or more processors, such as a processor 107, for instance represented by at least a first Central Processing Unit, CPU, and/or at least a first Graphics Processing Unit, GPU, together with computer program code for performing the functions and actions of the embodiments herein. Said program code may also be provided as a computer program product, for instance in the form of a data carrier carrying computer program code for performing the embodiments herein when being loaded into the MRM planning system 1. One such carrier may be in the form of a CD/DVD ROM disc and/or a hard drive, it is however feasible with other data carriers. The computer program code may furthermore be provided as pure program code on a server and downloaded to the MRM planning system 1. The MRM planning system 1 may further comprise a memory 108 comprising one or more memory units. The memory 108 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 108 may be arranged to be used to store e.g. information, and further to store data, configurations, scheduling, and applications, to perform the methods herein when being executed in the MRM planning system 1. For instance, the computer program code may be implemented in the firmware, stored in FLASH memory 108, of an embedded processor 107, and/or downloaded wirelessly e.g. from an off-board server. Furthermore, units 101-16, the optional processor 107 and/or the optional memory 108, may at least partly be comprised in one or more nodes 109 e.g. ECUs of the vehicle 2, e.g. in and/or in association with the ADS 21. Those skilled in the art will also appreciate that said units 101-106 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 108, that when executed by the one or more processors such as the processor 107 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 4:
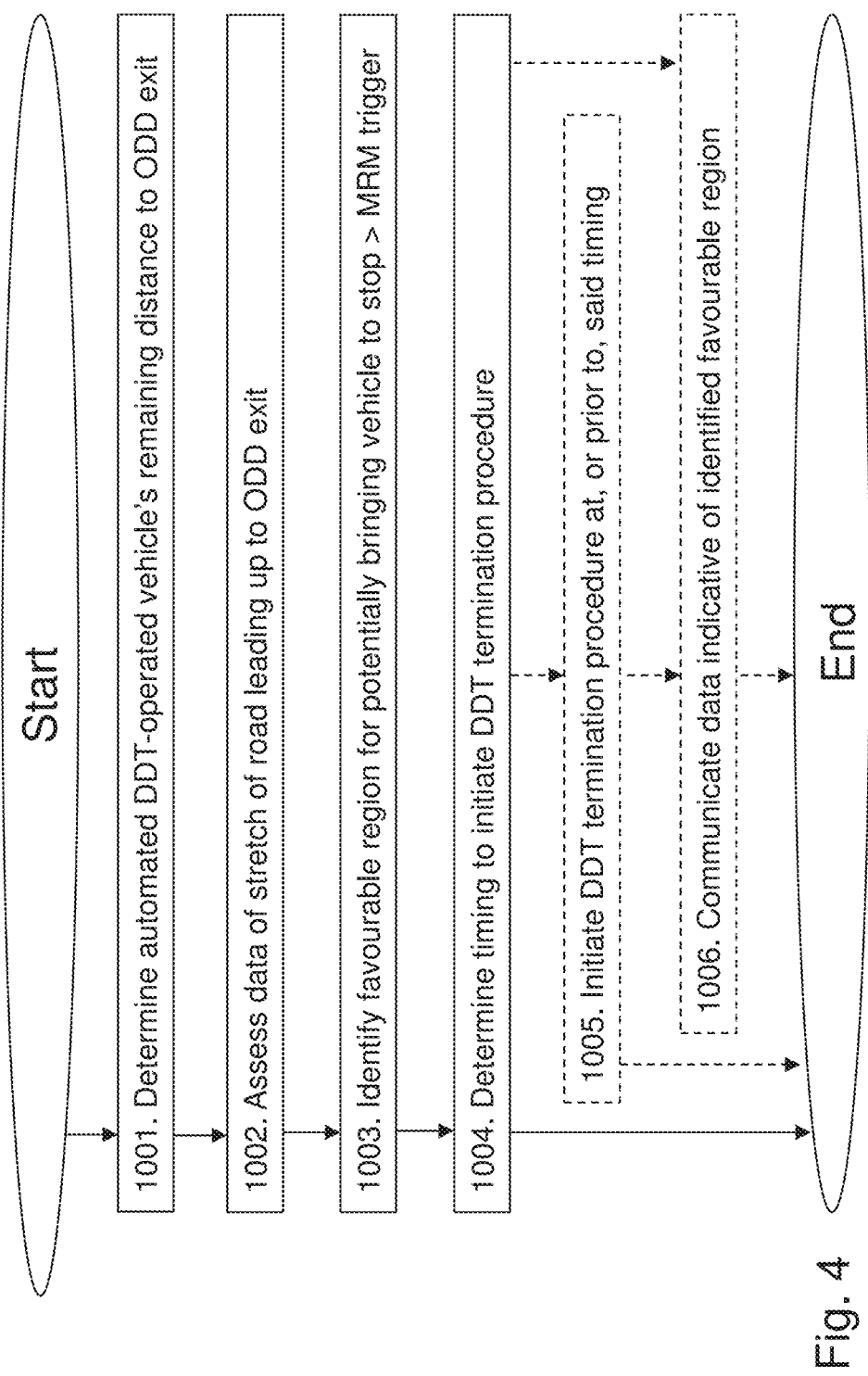
FIG. 4 is a flowchart depicting an exemplifying method performed by an MRM planning system according to embodiments of the disclosure.

FIG. 4 is a flowchart depicting an exemplifying method performed by an MRM planning system 1 according to embodiments of the disclosure. Said method is for supporting planning of an MRM of a vehicle ADS 21. The exemplifying method, which may be continuously repeated, comprises one or more of the following actions discussed with support from FIGS. 2-3. Moreover, the actions may be taken in any suitable order and/or one or more actions may be performed simultaneously and/or in alternate order where applicable. For instance, optional Actions 1005 and 1006 may be performed simultaneously and/or in alternate order.
Action 1001

In Action 1001, the MRM planning system 1 determines—e.g. with support from the remaining distance determining unit 101—while a dynamic driving task, DDT, of the vehicle 2 is performed by an autonomous driving mode of said ADS 2), a remaining distance 3 to an upcoming operational design domain, ODD, exit 4 at which an ODD defined for the autonomous driving mode is planned to end.
Action 1002

In Action 1002, the MRM planning system 1 assesses—e.g. with support from the data assessing unit 102—when the remaining distance 3 is shorter than a predeterminable distance, data 5 associated with a stretch of road 6 leading up to the ODD exit 4, which data 5 is indicative of potential temporary and/or emergency stopping areas, shoulder lanes and/or margin space alongside a lane or lanes of the stretch of road 6, and/or potential occupancy and/or obstruction thereof.

Optionally, Action 1002 of assessing may comprise—and/or the data assessing unit 102 may optionally be adapted and/or configured for—assessing data 5 comprising map-based data 51, which map-based data 51 for instance may be derived from a digital map 22, such as a high definition, HD, map, covering the stretch of road 6.

Further optionally, Action 1002 of assessing may comprise—and/or the data assessing unit 102 may further optionally be adapted and/or configured for—assessing data 5 comprising sensor-based data 52, which sensor-based data 52 for instance may be derived from at least a first surrounding detecting sensor capable of capturing surroundings covering at least a portion of the stretch of road 6.

Moreover, assessing data comprising sensor-based data 52 may further optionally comprise—and/or the data assessing unit 102 may further optionally be adapted and/or configured for—gathering at least a portion of the sensor-based data 52 from one or more sensors offboard the vehicle 2, for instance with support from at least a first inter vehicle communication service.
Action 1003

In Action 1003, the MRM planning system 1 identifies—e.g. with support from the favourable region identifying unit 103—based on the assessment of said data 5, a favourable region 60 along the stretch of road 6 for potentially bringing the vehicle 2 to a stop deemed safe subsequent a potential MRM being triggered.

Optionally, Action 1003 of identifying a favourable region 60 may comprise—and/or the favourable region identifying unit 103 may be adapted and/or configured for—selecting the favourable region 60 based on selection criteria striking a balance between respective levels of safety attributed to stopping in certain regions, and respective certain region's closeness to the ODD exit 4.
Action 1004

In Action 1004, the MRM planning system 1 determines—e.g. with support from the timing determining unit 104—a timing 8 at which to initiate an autonomous driving mode DDT termination procedure, for instance at which to provide a handover request prompting an occupant of the vehicle 2 to take over the DDT, which timing 8 is calculated to occur a predeterminable time duration and/or distance before the vehicle 2 reaching the identified favourable region 60.
Action 1005

In optional Action 1005, the MRM planning system 1 may initiate—e.g. with support from the optional DDT termination procedure initiating unit 105—an autonomous driving mode DDT termination procedure—such as providing a handover request 9 or trigger an MRM request—at, or prior to, said timing 8.
Action 1006

In optional Action 1006, the MRM planning system 1 may communicate—e.g. with support from the optional data communicating unit 106—data 600 indicative of the identified favourable region 60 to and/or within the ADS 21, for instance to a trajectory planner and/or vehicle motion control of the ADS 21.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a minimal risk maneuver (MRM) planning system for supporting planning of an MRM of an Automated Driving System (ADS) of a vehicle, the method comprising:

determining while a dynamic driving task (DDT) of the vehicle is performed by an autonomous driving mode of the ADS, a remaining distance to an upcoming operational design domain (ODD) exit at which an ODD defined for the autonomous driving mode is planned to end;

assessing, when the remaining distance is shorter than a predeterminable distance, data associated with a stretch of road leading up to the ODD exit, the data being indicative of one or more of:

one or both of temporary stopping areas and emergency stopping areas, one or both of shoulder lanes and margin space alongside a lane or lanes of the stretch of road, occupancy of one or more of the temporary stopping areas, the emergency stopping areas, the shoulder lanes, and the margin space; and obstruction of one or more of the temporary stopping areas, the emergency stopping areas, the shoulder lanes, and the margin space;

identifying based on the assessment of the data, a favourable region along the stretch of road for bringing the vehicle to a stop deemed safe should an MRM be triggered, the favourable region meeting a required level of safety and being within a threshold distance of the ODD exit, identifying the favourable region comprising selecting the favourable region, from among a plurality of assessed regions, based on selection criteria striking a balance between respective levels of safety attributed to stopping in certain regions, and respective certain region's closeness to the ODD exit; and determining a timing at which to initiate an autonomous driving mode DDT termination procedure, the timing being calculated to occur one or both of a predeterminable time duration and a distance before the vehicle reaching the identified favourable region.

2. The method according to claim 1, wherein the assessing comprises one or both of:

assessing data comprising map-based data covering the stretch of road; and assessing data comprising sensor-based data, the sensor-based data being derived from at least a first surrounding detecting sensor capable of capturing surroundings covering at least a portion of the stretch of road.

3. The method according to claim 2, wherein the assessing data comprising sensor-based data comprises gathering at least a portion of the sensor-based data from one or more sensors offboard the vehicle.

4. The method according to claim 3, wherein the gathering is performed with support from at least a first inter-vehicle communication service.

5. The method according to claim 1, further comprising: communicating data indicative of the identified favourable region to the ADS.

6. The method according to claim 5, wherein the data is communicated to one or both of a trajectory planner and a vehicle motion control of the ADS.

7. The method according to claim 1, wherein the determining a timing at which to initiate an autonomous driving mode DDT termination procedure comprises determining a timing at which to trigger an MRM.

8. A minimal risk maneuver (MRM) planning system for supporting planning of an MRM of an Automated Driving System (ADS) of a vehicle, the MRM planning system comprising at least one processor configured to:

determine while a dynamic driving task (DDT) of the vehicle is performed by an autonomous driving mode of the ADS, a remaining distance to an upcoming operational design domain (ODD) exit at which an ODD defined for the autonomous driving mode is planned to end;

assess, when the remaining distance is shorter than a predeterminable distance, data associated with a stretch of road leading up to the ODD exit, the data being indicative of one or more of:

one or both of temporary stopping areas and emergency stopping areas, one or both of shoulder lanes and margin space alongside a lane or lanes of the stretch of road, occupancy of one or more of the temporary stopping areas, the emergency stopping areas, the shoulder lanes, and the margin space; and obstruction of one or more of the temporary stopping areas, the emergency stopping areas, the shoulder lanes, and the margin space;

identify based on the assessment of the data, a favourable region along the stretch of road for bringing the vehicle to a stop deemed safe should an MRM be triggered, the favourable region meeting a required level of safety and being within a threshold distance of the ODD exit, identifying the favourable region comprising selecting the favourable region, from among a plurality of assessed regions, based on selection criteria striking a balance between respective levels of safety attributed to stopping in certain regions, and respective certain region's closeness to the ODD exit; and determine a timing at which to initiate an autonomous driving mode DDT termination procedure, the timing being calculated to occur one or both of a predeterminable time duration and a distance before the vehicle reaching the identified favourable region.

9. The MRM planning system according to claim 8, wherein the at least one processor is configured to one of both of:

assess data comprising map-based data covering the stretch of road; and assess data comprising sensor-based data, the sensor-based data being derived from at least a first surrounding detecting sensor capable of capturing surroundings covering at least a portion of the stretch of road.

10. The MRM planning system according to claim 9, wherein the at least one processor is adapted for gathering at least a portion of the sensor-based data from one or more sensors offboard the vehicle.

11. The MRM planning system according to claim 10, wherein the gathering is performed with support from at least a first inter-vehicle communication service.

12. The MRM planning system according to claim 8, wherein the at least one processor is further configured to:

communicate data indicative of the identified favourable region to the ADS.

13. The MRM planning system according to claim 12, wherein the data is communicated to one or both of a trajectory planner and a vehicle motion control of the ADS.

14. The MRM planning system according to claim 8, wherein the at least one processor is configured to determine a timing at which to trigger an MRM.

15. The MRM planning system according to claim 8, wherein the MRM planning system is comprised in a vehicle.

16. A non-transitory computer storage medium storing a computer program containing computer program code configured to cause one of a computer and a processor to performed a method for supporting planning of a minimal risk maneuver (MRM) of an Automated Driving System (ADS) of a vehicle, the method comprising:

determining while a dynamic driving task (DDT) of the vehicle is performed by an autonomous driving mode of the ADS, a remaining distance to an upcoming operational design domain (ODD) exit at which an ODD defined for the autonomous driving mode is planned to end;

assessing, when the remaining distance is shorter than a predeterminable distance, data associated with a stretch of road leading up to the ODD exit, the data being indicative of one or more of:

one or both of temporary stopping areas and emergency stopping areas, one or both of shoulder lanes and margin space alongside a lane or lanes of the stretch of road, occupancy of one or more of the temporary stopping areas, the emergency stopping areas, the shoulder lanes, and the margin space; and obstruction of one or more of the temporary stopping areas, the emergency stopping areas, the shoulder lanes, and the margin space;

identifying based on the assessment of the data, a favourable region along the stretch of road for bringing the vehicle to a stop deemed safe should an MRM be triggered, the favourable region meeting a required level of safety and being within a threshold distance of the ODD exit, identifying the favourable region comprising selecting the favourable region, from among a plurality of assessed regions, based on selection criteria striking a balance between respective levels of safety attributed to stopping in certain regions, and respective certain region's closeness to the ODD exit; and determining a timing at which to initiate an autonomous driving mode DDT termination procedure, the timing being calculated to occur one or both of a predeterminable time duration and a distance before the vehicle reaching the identified favourable region.

17. The non-transitory computer storage medium according to claim 16, wherein the assessing comprises one or both of:

assessing data comprising map-based data covering the stretch of road; and assessing data comprising sensor-based data, the sensor-based data being derived from at least a first surrounding detecting sensor capable of capturing surroundings covering at least a portion of the stretch of road.

* * * * *